INVENTOR.
WILLIAM J. McBRADY
BY E. T. McCabe
ATTORNEY.

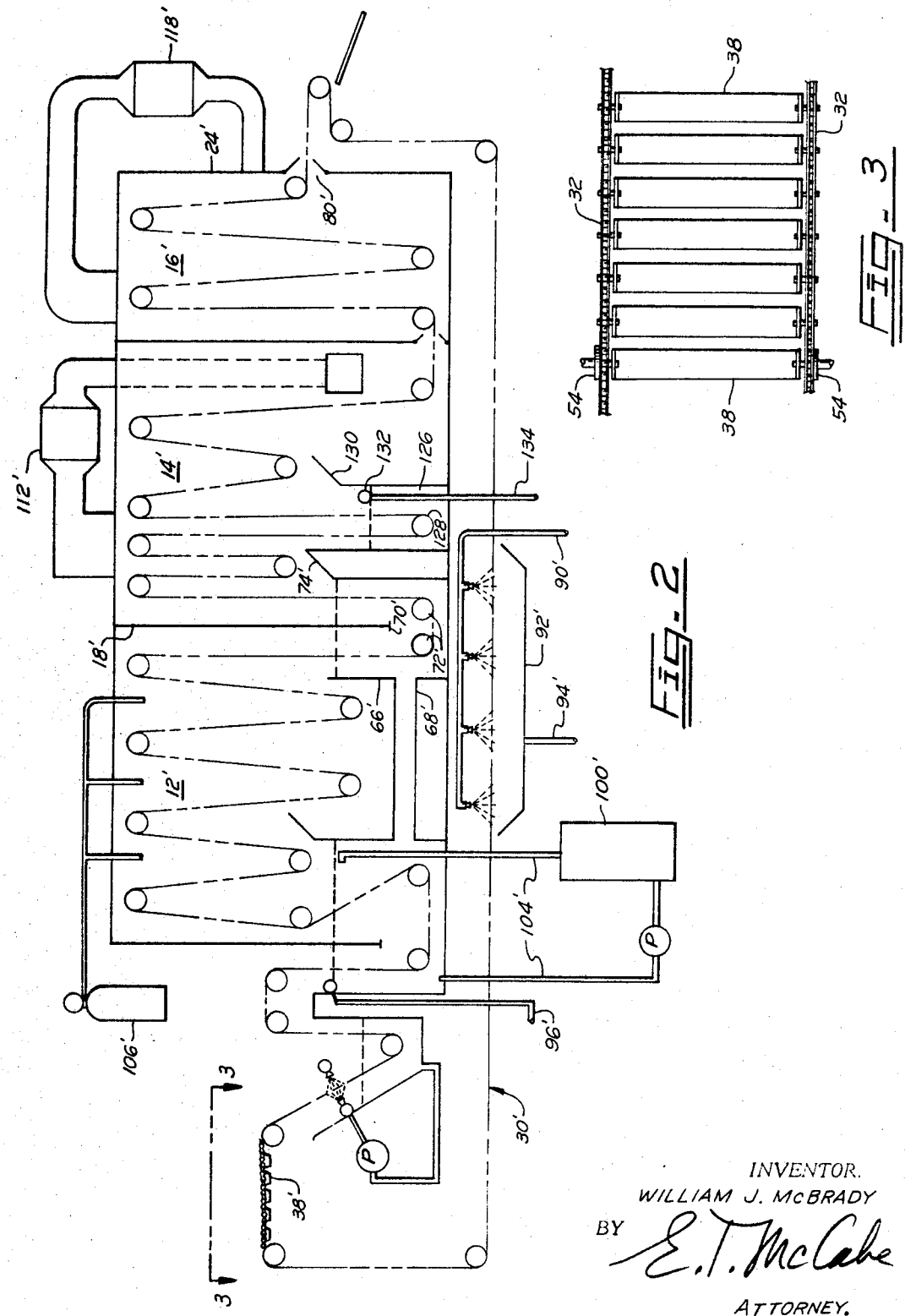

United States Patent Office 3,393,629
Patented July 23, 1968

3,393,629
CURING APPARATUS
William J. McBrady, Hazel Crest, Ill., assignor to Swift & Company, Chicago, Ill., a corporation of Illinois
Filed Nov. 29, 1965, Ser. No. 510,295
10 Claims. (Cl. 99—254)

ABSTRACT OF THE DISCLOSURE

An enclosure is provided wherein meat products are rapidly treated with nitrogen oxide gas to effect a cure. Meat is carried on an endless conveyor through a plurality of vertical runs arranged serpentine fashion throughout the enclosure which is divided into three compartments. Before entering the enclosure, the conveyor and product is carried through an acid treating sump and then enters the first chamber of the enclosure through a basin containing a heated flavor developing liquid such as a solution of salt and sugar. Within the first chamber, a gaseous nitric oxide atmosphere is maintained; and the conveyor and product exits the first chamber through a similar basin containing the flavor developing liquid. A second chamber is devoted to maintaining a heated atmosphere for developing the cure. This chamber may also be subjected to a smoke atmosphere or a vessel containing liquid smoke may be situated where a run of the conveyor will pass through it. The third and final chamber of the enclosure contains a chilling atmosphere through which the conveyor passes before discharging the product exterior of the enclosure.

---

Figure 1:
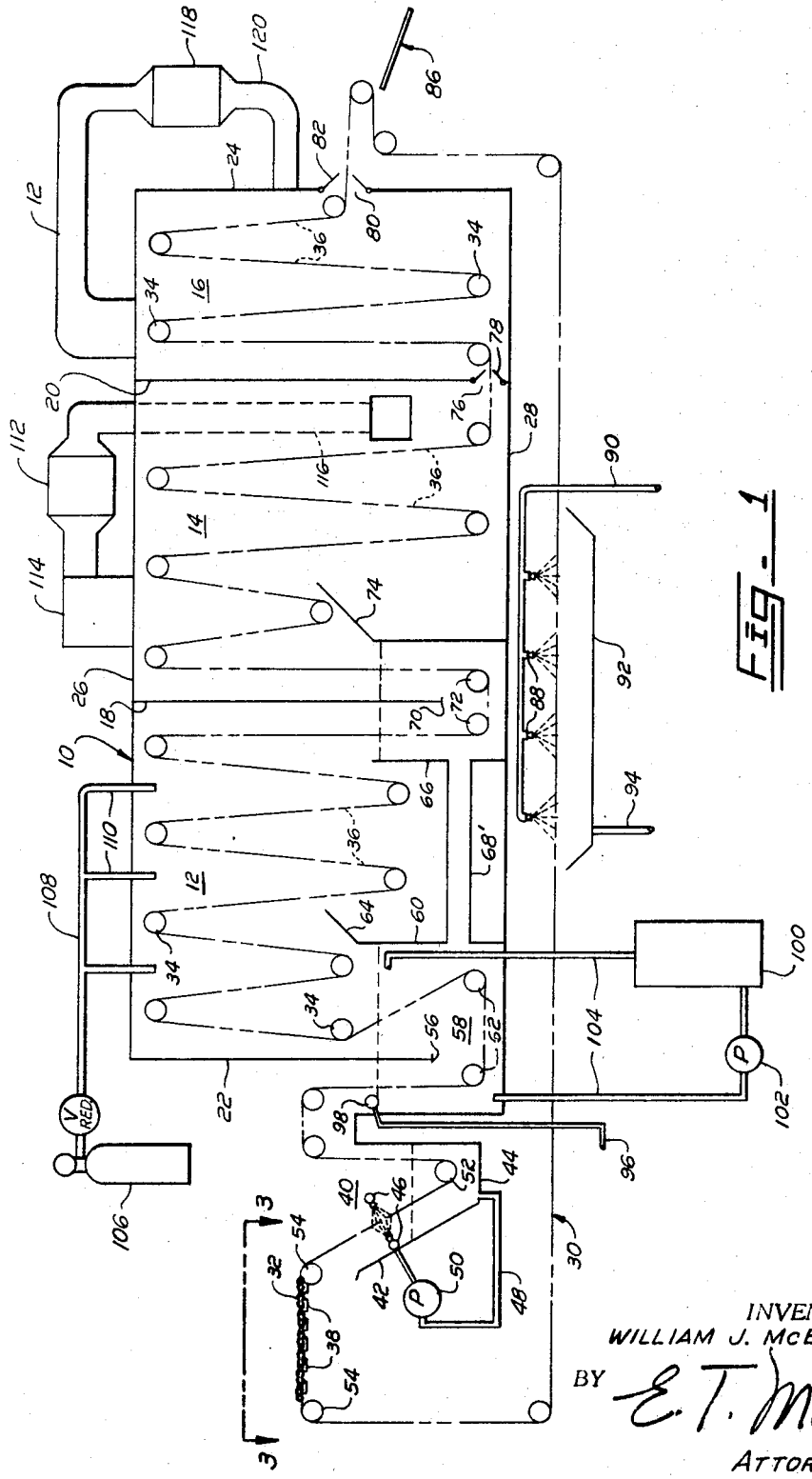

This invention relates to the curing of meat, and more particularly to an improved apparatus for rapidly curing meat products with gaseous nitric oxide.

In the past the curing of meat products has been a slow and arduous process. For example, the conventional process for curing of pork bellies consisted of initially injecting a curing solution and salt and sugar into the fresh bellies. The bellies were then placed in a smokehouse, heated to about 126° F., and smoked. This portion of the conventional processing required about 8 to 16 hours. Thereafter, the cured bellies were chilled to a temperature of about 26° F., often taking from 48 to 72 hours. Finally, the cured and chilled bellies were pressed, sliced, and the slices packaged. Curing normally involves curing salts such as nitrites and nitrates, generally sodium nitrite.

One of the objectives of the curing process is to develop a satisfactory "cured color" in the product. It has been thought that the curing process could be speeded by subdividing the unprocessed material into smaller units, that is, bacon, for example, could be cured faster as slices than as a slab. However, attempts to use the usual curing salts in rapid manner have not proved successful.

It has been discovered, however, that fresh meats, especially raw bacon, when exposed to pure nitric oxide will rapidly cure and develop an acceptable cured color when used in conjunction with an acid treating step. Rapid continuous processing of raw meats by nitric oxide without the use of an acid treatment will not develop the desired color in the products. However, when the items are treated with acid prior to the application of nitric oxide gas, a good cured color uniformly results.

No claim is made to the process for rapidly curing meat disclosed herein. It is, however, a primary object of the instant invention to provide an improved apparatus for continuous rapid curing of raw meat products.

Another object of the present invention is to provide improved apparatus for curing meat products with nitric oxide gas.

A further object of the present invention is to provide an improved apparatus for the rapid curing of meat products by nitric oxide gas following an acid treatment of such products.

Basically the present invention comprises a first liquid applying means intended to treat meat items with an acid, and a subsequent series of chambers entered through a pool of liquid whereby nitric oxide gas may be confined in the first chamber. Chambers subsequent to the first chamber allow for heating and drying of the product, and chilling of the product preparatory to packaging. A conveyor means is also provided to continuously carry meat product through the aforementioned apparatus. Generally, the apparatus is devised to cure product that has previously been smoked. However, one embodiment of the apparatus provides for the application of a liquid smoke solution immediately following the chamber wherein the product is exposed to nitric oxide gas.

Further objects and advantages of the present invention will become apparent upon reading the following detailed description in conjunction with the drawings wherein:

The FIGURE 1 is a sectional side elevation of a preferred embodiment of the present invention devised to process pre-smoked items;

FIGURE 2 is a sectional side elevation of a preferred embodiment of apparatus modified to process items not previously smoked; and FIGURE 3 is a detailed plan view of a portion of the endless conveyor equipment for carrying product in the apparatus of FIGURES 1 and 2.

In the nitric oxide curing of meat, it has been found preferable to adjust the meat surface to about pH 4 to pH 5 before exposing the items to nitric oxide gas. This pH adjustment is necessary to obtain the most desirable cured color in the product. However, raw meat is usually found to have a normal pH between 6 and 6.8. In addition to this, meat has a strong buffering action and, therefore, requires relatively strong acids or strong concentrations of acids to adjust the surface pH to within the required range.

Additionally, in the preferred rapid curing technique, the meat temperature is raised to between 125° F. and 140° F. before the application of nitric oxide. It is also preferable to treat the meat with flavoring agents such as salts and sugars.

In the course of devising and perfecting the present apparatus, it was found that if smoking of the product were undertaken by heating gaseous smoke after the product had been exposed to nitric oxide gas for the development of cured color, an uneven discoloration often occurred. Accordingly, it is preferred, if the product is to be smoked, that smoking be undertaken by conventional means prior to nitric oxide curing, or be limited to the application of liquid smoke solutions following nitric oxide curing.

Referring to FIGURE 1, a preferred apparatus includes an elongated air tight enclosure generally 10, that is divided into compartments or chambers, preferably including a first chamber 12 for containing nitric oxide gas, a second chamber 14 wherein product is heated and dried, and a third and final chamber 16 wherein the product is chilled preparatory to storage and/or packaging. The foregoing chambers are defined by bulkheads 18 and 20 and front and rear end walls 22, 24 extending vertically between top 26 and bottom 28 structures. Sidewalls (not shown) complete the enclosure.

Conveying means is provided in the form of an endless foraminous conveyor generally 30 preferably comprised of a pair of chains 32 trained about a plurality of upper and lower sprockets 34 within the chambers, so as to pass through a series of substantially vertical runs 36 within the enclosure 10. Foraminous baskets or trays 38 are pivotally suspended and uniformly spaced between the chains 32 in a well-understood manner that permits the baskets to remain horizontally disposed throughout the serpentine travel of the conveyor. Other forms of endless conveyors would also be suitable. For instance a pair of open mesh conveyors may be utilized to sandwich the product between conveyor surfaces through the enclosure 10. Similarly a mesh conveyor and cooperating endless ribbons may be utilized where the ribbons are trained to hold the product against the conveyor throughout travel within the enclosure 10.

Beginning at the left side of the apparatus as viewed in FIGURE 1, the conveying means, after being loaded with product, is initially exposed to a first liquid applying means generally 40 intended to treat the product with acid. Sulfuric, hydrochloric, citric, lactic, ascorbic, and phosphoric acids are suitable; however, lactic acid is preferred. The conveyor 30 is trained to dip through a trough 42 containing a sump 44 and a plurality of spray heads 46 through which the acid may be recirculated by pipe 48 and a pump 50. The spray heads 46 are positioned to expose all surfaces of the product within baskets 38 to the acid spray. A body of liquid acid may also be maintained within the trough 42 through which the baskets will be carried as the conveyor passes around sprockets 52.

The conveyor then rises and passes about a pair of sprockets 54, exterior of the enclosure generally 10, and then extends downwardly and through an entrance opening 56 in the lower portion of the front end wall 22. The opening 56 is entirely submerged beneath a liquid pool 58 confined within an entrance basin 60. The conveyor chains 32 descend into the pool 58 outside the enclosure 10, pass about submerged sprockets 62, and ascend within chamber 12 inside the enclosure generally 10. The first two or three vertical runs 36 of the conveyor are located above the entrance basin 60 and an inwardly directed drip flange 64, thereof, to return falling liquid to the pool 58.

Thereafter the conveyor generally 30 passes through a number of vertical runs and finally exits chamber 12 through an exit basin 66 and a communicating port 70 in bulkhead 18 leading to chamber 14. The exit basin 66 contains a similar liquid pool, and, in fact, preferably connects with the entrance basin 60 through a conduit 68. The communicating port 70 is completely submerged and the conveyor generally 30 descends within chamber 12 into the basin 66 (and liquid), then passes beneath one or more pairs of submerged sprockets 72 and ascends from the basin 66 within chamber 14. Again the conveyor is trained about a few vertical runs above the basin 66 and a drip flange 74 so as to return falling liquid to the pool.

After passing through a further number of vertical runs the conveyor generally 30 exits from chamber 14, which is a heating chamber, through a transfer opening 76 at the bottom of bulkhead 20 and enters the chilling chamber 16. A flap valve 78, formed of a suitable flexible material, is preferably located at the transfer opening 76 to minimize the movement of heated or chilled air between chambers 14 and 16.

The conveyor generally 30 then extends through additional vertical runs within chamber 16 and finally exits through a discharge opening 80 similarly provided with a flap valve 82 to minimize loss of chilled air from chamber 16.

Finally the conveyor generally 30 is trained about a pair of terminal inverting sprockets 84, exterior of the enclosure 10, whereby product carried by the conveyor in the baskets 38, or the like, will be dropped onto a product receiving means generally 86. The latter transfers the product to storage or packaging equipment or the like (not shown).

Thereafter the conveyor generally 30 returns beneath the enclosure to the loading position and acid applying means generally 40. In the course of this return the conveyor is exposed to washing equipment including a plurality of spray heads 88 connected to a water manifold 90 and positioned over a pan 92. Used water is discharged through a drain pipe 94.

Again referring to the basins 60 and 66 liquid for the pool 58 is delivered through a supply line 96 and float valve 98 to maintain a constant liquid level. Preferably the liquid supply (not shown) is made up of a solution containing 12 to 15% salt and 3 to 5% brown sugar to impart flavor values to the product. The liquid may also contain sufficient acid to maintain the solution, and the product passing therethrough, within the desired pH range between pH 4 and 5.

It is also preferred that the liquid pool 58 be maintained at the elevated temperature between 125° F. and 140° F. For this purpose a liquid heater 100 is provided along with a circulating pump 112 and suitable pump 104 to continuously recirculate the liquid from pool 58 through the heater.

Again referring to the chamber 12, nitric oxide gas is supplied from a pressurized tank or cylinder 106 through a manifold 108 and a plurality of connectors 110. The gas within chamber 12 may be maintained at normal atmospheric pressure or slightly thereabove. A pressure regulator valve is included for this purpose.

An air heater and fan 112 and suitable delivery duct work 114 and return duct work 116 are connected with chamber 14 so as to provide a continuous movement of warm air. Similarly, a refrigeration unit and fan 118 and suitable supply duct work 120 and return duct work 122 are connected to chamber 16 so as to provide a continuous supply of chilled air thereto.

The modified embodiment of the preferred apparatus shown in FIGURE 2 is devised for treating product not previously smoked but to which a smoked flavor is desirably imparted. The apparatus of FIGURE 2 is substantially the same as that shown in FIGURE 1 and like parts are identified by life reference characters bearing a prime exponent. The equipment varies only with the inclusion of a further tank 126 within the chamber 14 to contain a "liquid smoke" solution. Such material is available on the commercial market and its use has been approved by the U.S. Government.

A pair of sprockets 128 are submerged within the tank 126 and vertical runs of the conveyor generally 30 extend thereabout beneath the surface of the "liquid smoke." A drip flange 130 is provided on the downstream edge of the tank 126 so as to receive liquid falling from the immediately adjacent runs of conveyor 30. Liquid smoke solution is supplied through a float valve 132 and pipe 134 whereby a desired level of the solution may be maintained within the tank 126.

Obviously many modifications and variations of the invention as hereinbefore set forth may be made without departing from the spirit and scope thereof, and therefore only such limitations should be imposed as are indicated in the appended claims.

I claim:
1. An improved apparatus for effecting the rapid curing of meat products, said apparatus comprising: first liquid applying means; a liquid basin adjacent said applying means; a gas chamber confined above said basin; a heating chamber beyond said basin, said heating chamber communicating with said gas chamber through said basin; a cooling chamber adjoining said heating chamber and in communication therewith; and conveying means trained to run sequentially through said first liquid applying means, basin, gas chamber, heating chamber, and cooling chamber.

2. The apparatus of claim 1 wherein said first liquid applying means includes a first sump separate from said basin so as to segregate the liquids in said means and said basin.

3. The apparatus of claim 2 including a means to recirculate liquid to said first liquid applying means from said sump.

4. The apparatus of claim 1 wherein said conveying means is trained in a plurality of substantially serpentine runs within each of said gas, heating, and cooling chambers and said conveying means is trained to enter and exit said gas chamber and enter said heating chamber beneath a level of liquid in said basin.

5. The apparatus of claim 1 wherein said conveying means is a pair of endless chains, carrying a succession of pivotally suspended upwardly open foraminous baskets, trained in a plurality of substantially serpentine runs within each of said gas, heating, and cooling chambers and said conveying means is trained to enter and exit said gas chamber and enter said heating chamber beneath a level of liquid maintained in said basin.

6. The apparatus of claim 1 wherein said conveying means is an endless foraminous structure trained in a plurality of substantially vertical serpentine runs within each of said gas, heating, and cooling chambers and said conveying means is trained to enter and exit said gas chamber and enter said heating chamber beneath a level of liquid maintained in said basin.

7. The apparatus of claim 6 wherein a further liquid applying means comprising a tank of another liquid is positioned within said heating chamber beyond said basin, and at least one vertical serpentine run of said conveying means within said heating chamber extends beneath the surface of the liquid in said tank, before said conveying means traverses said heating chamber.

8. The apparatus of claim 1 wherein a further liquid applying means is positioned within said heating chamber beyond said basin and said conveying means is trained to run therethrough after entering said heating chamber through said basin, and before traversing said heating chamber.

9. An improved apparatus for effecting the rapid curing of meat products, said apparatus comprising: first liquid applying means; means to recirculate liquid to said first liquid applying means; a liquid basin adjacent said applying means; a supply of liquid for said basin; a liquid recirculating and heating means for liquid in said basin; a gas chamber confined above said basin; a supply of gas connected to said chamber; a heating chamber beyond said basin, said heating chamber communicating with said gas chamber through said basin; air heating and recirculating means for said heating chamber; a cooling chamber adjoining said heating chamber and in communication therewith; air cooling and recirculating means for said cooling chamber; and conveying means trained to run sequentially through said first liquid applying means, basin, gas chamber, heating chamber, and cooling chamber.

10. The apparatus of claim 9 wherein said conveying means is a pair of endless chains carrying a succession of pivotally suspended upwardly open baskets trained in a plurality of substantially vertical serpentine runs within each of said gas, heating, and cooling chambers and said conveying means is trained to enter and exit said gas chamber and enter said heating chamber beneath a level of liquid maintained in said basin.

References Cited
UNITED STATES PATENTS

| | | | |
|---|---|---|---|
| 767,962 | 8/1904 | Ruff | 99—362 |
| 886,097 | 4/1908 | Vaudreuil. | |
| 2,136,124 | 11/1938 | Berger | 99—260 X |
| 2,566,966 | 9/1951 | Rockoff | 99—261 |
| 2,880,663 | 4/1959 | Simjian | 99—254 |
| 3,059,272 | 10/1962 | Millenaar | 99—261 |
| 3,073,236 | 1/1963 | Blaschek et al. | 99—260 X |
| 3,220,855 | 11/1965 | Shank. | |

WALTER A. SCHEEL, *Primary Examiner.*

J. NEARY, *Assistant Examiner.*